(12) United States Patent
Oancea

(10) Patent No.: US 8,740,289 B2
(45) Date of Patent: Jun. 3, 2014

(54) MOTOR VEHICLE HAVING A U-SHAPED BOW

(75) Inventor: Nikolaus Oancea, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 71 days.

(21) Appl. No.: 13/315,993

(22) Filed: Dec. 9, 2011

(65) Prior Publication Data

US 2012/0107071 A1    May 3, 2012

Related U.S. Application Data

(63) Continuation of application No. PCT/EP2010/058041, filed on Jun. 9, 2010.

(30) Foreign Application Priority Data

Jun. 10, 2009   (DE) .......................... 10 2009 024 453

(51) Int. Cl.
*B60N 2/28* (2006.01)
*F16B 19/10* (2006.01)
*E05B 65/12* (2006.01)

(52) U.S. Cl.
USPC ..................................... 296/193.01; 411/502

(58) Field of Classification Search
CPC .... B29C 65/561; B29C 65/60; B29C 65/602; B29C 65/603; F16B 19/1054; F16B 19/1045; F16B 19/1063; F16B 19/086; F16B 19/1036; F16B 19/1072; F16B 5/02; F16B 19/10; B32B 2605/00; B21J 15/025; B21J 15/041; B21J 15/36; B21J 15/105; B21J 15/386; B21J 15/326; B21J 15/048; B21J 15/04; B21J 15/043; B25B 7/10
USPC ........ 296/193.01, 1.02, 39.1, 214, 210, 1.08; 411/45, 57.1, 58, 59, 79; 16/444, 445, 16/412, 438
See application file for complete search history.

(56) References Cited

U.S. PATENT DOCUMENTS

| 2,239,798 | A | * | 4/1941 | Tinnerman | 16/422 |
| 3,145,050 | A | * | 8/1964 | Edwards | 297/183.8 |
| 4,222,304 | A | * | 9/1980 | Yoshida et al. | 411/34 |
| 4,404,709 | A | * | 9/1983 | Janz et al. | 16/444 |
| 4,912,809 | A | * | 4/1990 | Scheuer | 16/413 |
| 5,519,917 | A | * | 5/1996 | Cordonnier | 16/422 |
| 5,924,611 | A | * | 7/1999 | Mizuno | 224/42.4 |
| 5,938,368 | A | * | 8/1999 | Anderson | 403/282 |
| 6,176,660 | B1 | * | 1/2001 | Lewis et al. | 411/45 |
| 6,836,932 | B2 | * | 1/2005 | Yamamoto et al. | 16/110.1 |
| 2009/0315383 | A1 | * | 12/2009 | Braun | 297/452.11 |

* cited by examiner

*Primary Examiner* — Glenn Dayoan
*Assistant Examiner* — Sunsurraye Westbrook
(74) *Attorney, Agent, or Firm* — Crowell & Moring LLP

(57) ABSTRACT

A motor vehicle has a U-shaped bow which can be simply fastened to a sheet metal component. The U-shaped bow is developed at each free end as a blind rivet. The U-shaped bow itself forms the pull mandrel for the blind rivets. Such a U-shaped bow can be used, for example, for fastening a child seat in the motor vehicle according to the Isofix standard, for a locking bow for a lock of a door or lid of the motor vehicle and/or for serving cargo in a vehicle trunk.

18 Claims, 1 Drawing Sheet

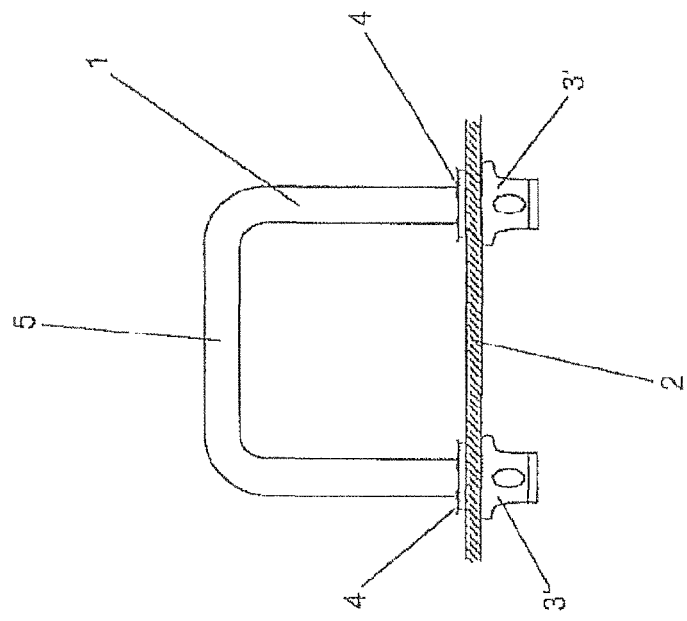
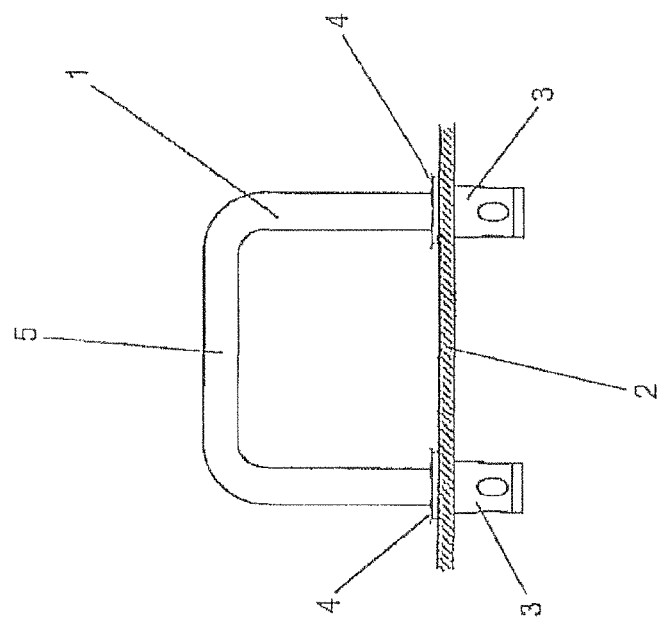

MOTOR VEHICLE HAVING A U-SHAPED BOW

CROSS-REFERENCE TO RELATED APPLICATIONS

This application is a continuation of PCT International Application No. PCT/EP2010/058041, filed Jun. 9, 2010, which claims priority under 35 U.S.C. §119 from German Patent Application No. DE 10 2009 024 453.0, filed Jun. 10, 2009, the entire disclosures of which are herein expressly incorporated by reference.

BACKGROUND AND SUMMARY OF THE INVENTION

The invention relates to a motor vehicle having a U-shaped bow.

Many of today's motor vehicles utilize a U-shaped bow, which is fastened at both of its free ends to a flat sheet metal component. Such a U-shaped bow can be used, for example, for fastening a child seat in the motor vehicle according to the so-called Isofix standard. It can be also used as a locking bow for a lock of a door or lid (trunk or hood) of the motor vehicle. It can further be provided in the vehicle trunk for securing cargo, etc. Normally, for fastening to the flat sheet metal component, the U-shaped bow is connected with a carrier plate which rests flatly on the sheet metal component. The carrier plate, in turn, is welded, screwed or riveted to the sheet metal component.

From German Patent document DE 295 09 439 U1, a punch rivet is known which has a threaded bolt molded to the rivet head. Furthermore, from German Patent document DE 41 00 709 A1, a blind rivet nut having a pull mandrel is known, the pull mandrel being constructed as a preassembled cap screw whose cap forms the abutment for a setting tool.

It is an object of the invention to create a motor vehicle with a U-shaped bow which can be fastened to a sheet metal component in a simple manner.

This and other objects are achieved by a U-shaped bow for a motor vehicle wherein, according to the invention, the U-shaped bow is further developed at its two free ends as a blind rivet. The U-shaped bow itself forms respectively the pull mandrel of the blind rivets. A blind rivet is a special form of rivet which requires access to only one side of the components to be connected and is fastened by use of a special setting tool. During blind riveting, the joining operation takes place from only one side of the component. The blind rivet is inserted through the bore; then the pull mandrel projecting at the head is pulled out by way of the setting tool. This leads to an upset and thereby to a widening of the rivet behind the bore. According to the invention, the end sections of the U-shaped bow are used as pull mandrels.

For the fastening to the sheet metal component, the U-shaped bow according to the invention is fitted with its two ends through one through-hole, respectively, in the sheet metal component. Subsequently, the ends in the through holes are riveted like normal blind rivets. In this case, the end sections of the U-shaped bow are used as pull mandrels. The center section of the U-shaped bow, for example, can be used as an advantageous point of application for pulling out the pull mandrels.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 is a schematic view of a U-shaped bow which is fitted with its two ends through two respective through holes in a flat sheet metal component of a body of a motor vehicle; and FIG. 2 is a schematic view of the arrangement of FIG. 1 after the riveting of the U-shaped bow to the sheet metal component.

DETAILED DESCRIPTION OF THE DRAWINGS

FIG. 1 illustrates a U-shaped bow 1 which is to be fastened to a flat sheet metal component 2 of a vehicle body. For this purpose, the U-shaped bow 1 is, in each case, further developed on its two ends as a blind rivet. The end sections of the U-shaped bow 1 are each axially surrounded by a rivet sleeve 3, a hollow space being situated in each case between the rivet sleeve 3 and the end section of the U-shaped bow 1. At the ends of the rivet sleeves 3 facing the ends of the U-shaped bow 1, the rivet sleeves 3 are connected with the ends of the U-shaped bow 1, so that the end sections of the U-shaped bow 1 can be used as a pull mandrel for the blind rivet. At the other ends of the rivet sleeves pointing away from the ends of the U-shaped bow 1 (i.e. pointing toward the cross-portion 5 of the U-shaped bow), the rivet sleeves 3 each have a collar 4 projecting radially outward.

For riveting the U-shaped bow 1 to the sheet metal component 2, the ends of the U-shaped bow 1 are now—as illustrated in FIG. 1—in each case fitted through a through hole in the sheet metal component 2 until the collars 4 of the rivet sleeves 3 rest on the sheet metal component 2. In this case, the diameter of the through holes corresponds approximately to the outside diameter of the rivet sleeves 3.

The setting tool for riveting the U-shaped bow 1 is supported by the collars 4 of the rivet sleeves 3. The center section (cross-portion) 5 of the U-shaped bow 1 is used as an abutment which, relative to the collars 4 of the rivet sleeves 3, is pulled upward away from the flat sheet metal component 2. As a result, the rivet sleeves 3' are upset—as illustrated in FIG. 2—so that the U-shaped bow 1 is held in a form-locking manner by the collars 4, on the one side, and the upset rivet sleeves 3', on the other side, in the through holes of the sheet metal component 2.

In this manner, the U-shaped bow 1 can be fastened to the sheet metal component 2 exclusively from one side of the sheet metal component. It does not have to be welded on or screwed on. The fastening by riveting takes place very rapidly and reliably with respect to the process, and in a cost-effective manner. No additional carrier plate is required.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fastener for a motor vehicle having a flat sheet metal component, comprising:
   a U-shaped bow fastenable with both ends to the flat sheet metal component, wherein each end of the U-shaped bow comprises a blind rivet with the U-shaped bow being a pull mandrel for the blind rivet, and the blind rivet is integrally formed on each end of the U-shaped bow.

2. The fastener for a motor vehicle according to claim 1, wherein each blind rivet at the ends of the U-shaped bow comprises a rivet sleeve axially surrounding an end section of the U-shaped bow with a hollow space being located between the rivet sleeve and the end section of the U-shaped bow.

3. The fastener for a motor vehicle according to claim 2, wherein each rivet sleeve comprises a radially outward projecting collar at a longitudinal end of the rivet sleeve facing away from the end of the U-shaped bow.

4. The fastener for a motor vehicle according to claim 2, wherein the rivet sleeve is connected with an end of the U-shaped bow at a longitudinal end of the rivet sleeve facing the end of the U-shaped bow.

5. The fastener for a motor vehicle according to claim 3, wherein the rivet sleeve is connected with an end of the U-shaped bow at the longitudinal end of the rivet sleeve facing the end of the U-shaped bow.

6. The fastener for a motor vehicle according to claim 1, wherein a center section of the U-shaped bow provides an abutment for a setting tool for the blind rivets.

7. The fastener for a motor vehicle according to claim 2, wherein a center section of the U-shaped bow provides an abutment for a setting tool for the blind rivets.

8. The fastener for a motor vehicle according to claim 3, wherein a center section of the U-shaped bow provides an abutment for a setting tool for the blind rivets.

9. The fastener for a motor vehicle according to claim 4, wherein a center section of the U-shaped bow provides an abutment for a setting tool for the blind rivets.

10. The fastener for a motor vehicle according to claim 2, wherein the sheet metal component comprises two through holes having respective diameters corresponding approximately to an outer diameter of a respective rivet sleeve to be fastened therein.

11. The fastener for a motor vehicle according to claim 3, wherein the sheet metal component comprises two through holes having respective diameters corresponding approximately to an outer diameter of a respective rivet sleeve to be fastened therein.

12. The fastener for a motor vehicle according to claim 4, wherein the sheet metal component comprises two through holes having respective diameters corresponding approximately to an outer diameter of a respective rivet sleeve to be fastened therein.

13. The fastener for a motor vehicle according to claim 6, wherein the sheet metal component comprises two through holes having respective diameters corresponding approximately to an outer diameter of a respective rivet sleeve to be fastened therein.

14. The fastener for a motor vehicle according to claim 1, wherein the U-shaped bow is a locking bow for a door or lid latch of the motor vehicle.

15. The fastener for a motor vehicle according to claim 1, wherein the U-shaped bow is a motor vehicle child seat fastener conforming to Isofix standard.

16. The fastener for a motor vehicle according to claim 1, wherein the U-shaped bow is a cargo securement ring in a trunk of the vehicle.

17. A fastener for a motor vehicle comprising:
a flat sheet metal component; and
a U-shaped bow having two longitudinal ends and a cross portion that joins the two longitudinal ends, wherein
each longitudinal end defines, at an end thereof, a blind rivet that is configured to fasten the U-shaped bow to the flat sheet metal component of the motor vehicle, and
the cross portion is shorter in length than the two longitudinal ends.

18. A U-shaped fastener for use in a motor vehicle, the U-shaped fastener comprising:
two longitudinal members that are substantially parallel to one another; and
a cross portion that is shorter in length than the two longitudinal members and that joins the two longitudinal members at a first end of the two longitudinal members, wherein
at a second end of the two longitudinal members, each longitudinal member defines: i) a collar that is configured to abut against a flat sheet metal component of the motor vehicle, and ii) a rivet mandrel, which upon pulling on the cross portion, fastens the U-shaped fastener against the flat sheet metal component of the motor vehicle.

\* \* \* \* \*